Figure 1A:
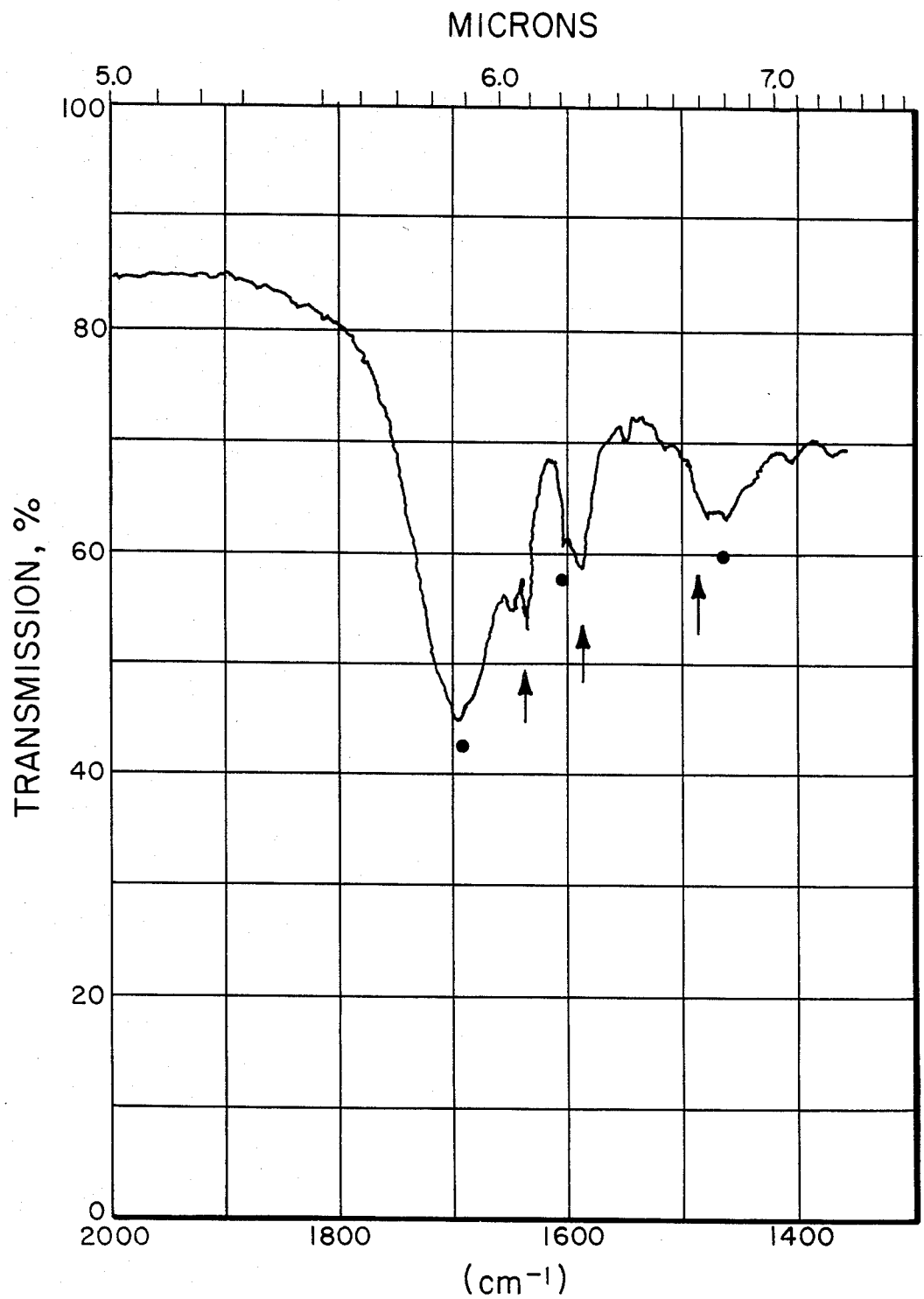

United States Patent [19]

Zamboni et al.

[11] Patent Number: 4,518,731

[45] Date of Patent: May 21, 1985

[54] PROCESS FOR THE CRYSTALLIZATION OF HIGH POLYMERS IN THE PRESENCE OF NUCLEANT SYSTEMS BASED ON ZEOLITES

[75] Inventors: Valentino Zamboni; Corrado Brichta; Claudio Troglia, all of Milan, Italy

[73] Assignee: Montedison S.p.A., Milan, Italy

[21] Appl. No.: 564,187

[22] Filed: Dec. 22, 1983

[30] Foreign Application Priority Data

Dec. 24, 1982 [IT] Italy ................. 24978 A/82

[51] Int. Cl.$^3$ .............................................. C08K 5/42
[52] U.S. Cl. ..................... 524/166; 524/287; 524/292; 524/450; 252/182
[58] Field of Search ............... 524/166, 450, 287, 292, 524/295; 252/182

[56] References Cited

U.S. PATENT DOCUMENTS

| | | | |
|---|---|---|---|
| 3,207,737 | 9/1965 | Wales | 524/398 |
| 3,327,021 | 6/1967 | Binsbergen | 524/166 |
| 3,367,926 | 2/1968 | Voeks | 524/94 |
| 3,517,086 | 6/1970 | Shirayama et al. | 524/166 |
| 4,006,037 | 2/1977 | Tirpak et al. | 524/450 |
| 4,124,562 | 11/1978 | Yui et al. | 524/450 |
| 4,134,847 | 1/1979 | Oda et al. | 427/150 |
| 4,250,081 | 2/1981 | Bode et al. | 524/450 |
| 4,440,889 | 4/1984 | Hergenrother et al. | 524/141 |

FOREIGN PATENT DOCUMENTS 0042316 12/1981 France ................. 524/450

OTHER PUBLICATIONS

Environmental Science & Technology, by Savitsky et al., vol. 15, No. 10, Oct. 1981, pp. 1191–1196.
Journal of Applied Polymer Science, by Beck, H. N., vol. II, pp. 673–685 (1967).
LexPat Search—by Examiner—4/20/84.

Primary Examiner—Joseph L. Schofer
Assistant Examiner—N. Sarofim

[57] ABSTRACT

The kinetics of crystallization of high polymers from the molten state is modified by adding to the polymers before the thermoforming step low amounts of a nucleating agent consisting of solid particles of crystalline zeolites treated with high-boiling acrylcarboxylic acid or sulphonic acid.

9 Claims, 2 Drawing Figures

- = BANDS CAUSED BY THE GROUP VIBRATIONS OF THE ACIDIC FORM.

(↑) = BANDS CAUSED BY THE GROUP VIBRATIONS OF THE ADDUCT.

ZEOLITE 4A + TBBA as such.

(↑) = BANDS CAUSED BY THE GROUP VIBRATIONS OF THE ADDUCT.
ZEOLITE 4A + TBBA, residue.
(after extraction with MTBE)

PROCESS FOR THE CRYSTALLIZATION OF HIGH POLYMERS IN THE PRESENCE OF NUCLEANT SYSTEMS BASED ON ZEO LITES

THE PRIOR ART

It is known that the addition of certain solid compounds with a high melting point or a high decomposition point may favourably modify the crystallization process.

These substances, indicated as nucleant agents, in as much as they influence the first stage of the crystallization process, that is the nucleation, allow to direct the process towards those conditions that are more favorable for obtaining peculiar properties in the molded polymeric material.

The use of organic nucleant agents is claimed in numerous technical publications and in patents, and covers a wide range of polymeric substances. For instance, in the case of isotactic polypropylene we may mention the most known ones: U.S. Pat. Nos. 3,207,737; 3,367,926 and 4,016,118.

However, the use, of these nucleant agents, claimed in the cited patents, do show some disadvantages and drawbacks, that is:

the necessity of high concentrations in nucleant agents in order to improve certain optical and mechanical properties;

difficulties in the homogeneous and uniform dispersion of the nucleant agent in the mass of materials, given the limits in the compatibility with the polymeric system;

the tendency to segregate of these nucleant agents during the operations of dry-mixing and the tendency to volatilize when the transformation temperature is high;

the migration of the nucleant agent inside the manufactured articles, altering the surface properties and favoring their transfer to the external environment; this involves the risk of attaining concentrations that are not admitted by the rules governing the use of these polymers in the field of foodstuffs and hygienic-sanitary products (FDA-USA rules).

THE PRESENT INVENTION

Thus, object of the present invention is that of providing a new type of nucleant agent and concerns its use in the nucleation of crystalline polymers, which will allow to achieve substantial improvements in the transformation processes for thermoplastical materials.

An even more precise object of this invention is that of preparing a nucleant formulation of the "general purpose" type suited for modifying the crystallization process of some classes of thermoplastic polymers when subjected to transformation processes which involve the passage from the molten state to the solid crystalline state.

Still a further object of the present invention is that of providing a method for the preparation of a nucleant system in which a porous inorganic support or carrier with a high specific superficial area and an organic polar compound with a high melting or decomposition point interact sterically and chemically with each other.

This system may be realized when either an arylcarboxylic or sulphonic acid, of the type defined in the following, is suitably distributed and combined on a porous solid support having a high specific surface area, and acting as a carrier, for which the zeolites are typical specimen.

Any crystallizable thermoplastic polymer—polyolefins, polyesters, polyamides—may be used in accordance with this invention, provided that there be a chemical inertia between the nature of the polymer and the type of zeolite used. The nucleant system according to the present invention is particularly indicated for:

stereo-arranged polyolefins such as polypropylene, crystalline polymers of ethylene and crystalline ethylene copolymers with other alpha-olefins ($C_3$, $C_4$, $C_6$).

The dispersion techniques for a nucleant system in the polymeric mass may be carried out according to the well known practice of the Art, starting from the compounds in the form of powders or of a masterbatch, formulated in suitable proportions, and by subjecting them to mixing-sintering-granulating-thermomolding etc. processes, as described in the literature on the processing of plastic materials and in the corresponding patents.

The nucleant system according to the present invention is not substantially influenced by the formulation process, wherefore it is suited for being used under severe operational conditions as far as the temperature, pressure on the material in the molten state, etc. are concerned.

The nucleant system according to the present invention is obtained starting from two essential components:

(a) a crystalline aluminum silicate of one or more alkaline or earthy-alkaline metals of the zeolitic tectosilicate type of controlled porosity and more particularly with a pore diameter comprised between 3 and 13 Å. The molar ratio of the oxides $SiO_2/Al_2O_3$, forming the skeleton of the crystal, may be comprised between 2 and 5.

(b) an arylcarboxylic or sulphonic acid, chosen from amongst those which are well known to exert, when in the form of metal salts, a nucleating effect on the crystalline polyolefinic polymers with a melt point exceeding the crystallization temperature of the polymer to be treated and that be thermically stable at the maximum processing temperature to which the polymeric material is subjected.

The aluminum silicate of point (a) practically is chosen from amongst the commercial zeolites known as molecular sieve or sifter of the type 3A, 4A, 5A, 10X, 13X and Y, in their salified form with Na and/or K and/or Ca.

The zeolites that are typically used in the preparation of the nucleant system have the characteristics reported by following table:

TABLE

| Structure | "A" | | | | "Faujasite" | |
| --- | --- | --- | --- | --- | --- | --- |
| Type | 3A | 4A | 5A | 10X | 13X | Y |
| Typical composition of oxides | 0.6 $Na_2O$ 0.4 $K_2O$ $Al_2O_3$ 2 $SiO_2$ | $Na_2O$ — $Al_2O_3$ 2 $SiO_2$ | 0.3 $Na_2O$ 0.7 CaO $Al_2O_3$ 2 $SiO_2$ | CaO — $Al_2O_3$ 2.4 $SiO_2$ | $Na_2O$ — $Al_2O_3$ 2.4 $SiO_2$ | $Na_2O$ & others — $Al_2O_3$ 4.8 $SiO_2$ |
| Nominal diameter | 3 | 4 | 5 | 8 | 10 | 10–13 |

| TABLE-continued | | |
|---|---|---|
| Structure | "A" | "Faujasite" |
| of pores (A): | | |

Zeolites suited for being used in the process shall have a mean size of the particles in the range from 0.1 to 10 micron, and preferably from 0.1 to 1 micron.

As far as the arylcarboxylic or sulphonic acid to be used is concerned, reference may be made to U.S. Pat. Nos. 3,367,926 and 3,207,737 and to the technical literature on the argument (see H. N. Beck in "Heterogeneous nucleating agents", in Journal of appl. Polymer Science, vol. II, pages 673–685 (1967), which mention numerous compounds suited for achieving the nucleating system according to this invention.

More particularly useful are the arylcarboxylic acids such as p.ter.butylbenzoic and the benzoic acid, the toluic, p-ethoxy- and p.methoxybenzoic acid, the salicyl acid, the naphthoic and the diphenylpropionic acids.

The nucleating system according to the present invention is obtained by making two components, that is a zeolite and arylcarboxylic acid, interact with each other under such conditions as to form an adduct in which the acid will bind itself to the zeolites "carrier" by means of physical and chemical bonds, the chemical bonds being of the polar type by interaction with the Na, K and Ca cations.

The adduct in general contains from 1 to 10% by weight of acid and may be considered as a zeolite modified superficially by the chemically adsorbed acid, that is, bound to it in a stable form.

The adduct may be obtained by various different technologies based on the impregnation and adsorption by the zeolite of the acid in solution or as such in the molten state. Amongst these techniques there may be cited some of the more typical:

1. Imbibition of the zeolite on the form of Na (or K or Ca), partially or totally dehydrated, with a solution of the arylcarboxylic acid in an organic solvent, followed by the separation of the solid adduct.
2. The mixing of the zeolite in the form of Na (or K or Ca) with arylcarboxylic acid in a substantially non-aqueous medium, followed by the separation of the solid phase from the excess of solution and by the drying at a temperature lower than the melt point temperature of the acid itself.
3. Pre-impregnation of the zeolite in the form of Na (or K, or Ca) with the acid and the mixing at the melt temperature of the same, possibly under pressure, and successive removal of the acid in excess of sublimation or washing with a suitable solvent (for instance ether, acetonitrile).
4. Impregnation-exchange of the zeolite in the form of Na (or K, or Ca), in a partially or totally dehydrated form, with a solution of the acid in a solvent/water mixture (for instance an azeotrope with acrylonitrile or isopropanol) and in a compelte evaporation of the solvent, under conditions wherein the crystalline structure of the zeolite will not collaps because of a too low pH of the liquid solvent phase.

A typical process for the preparation of the modified zeolite, according to the above indicated point 1, consists in a close and prolonged contact between the superficial ionic sites of the zeolite and of the carboxylic acid (polar compound) present in the aqueous solution (alcohols, ethers, ketones, nitriles). The treatment may be conducted with or without stirring, at temperatures comprised between room temperature and the boiling temperature of the solvent, at atmospheric pressure or a higher pressure.

From the mixture, after separation of the liquid phase, there is obtained, by centrifuging or filtering and successive fast washing, according to well known techniques of the Prior Art, a solid residue which is dried at such a temperature as to gradually remove the residual solvent still present in the interstices between the zeolite particles.

The system thus obtained may contain a quantity of organic acid that may be comprised between 1 and 25 grams per 100 g of initial zeolite, possibly present partially also in a chemically non-adsorbed form. The system may be subjected to a thermal treatment at high temperature in order to complete the exchange-reaction and facilitate the homogenizing of the system.

The solid system thus obtained is submitted to a chemical elementary analysis for establishing the compositional and structural characteristics:

C and H microanalyses in order to determine the content in carboxylic acid on the zeolite;

IR spectroscopic examination in teh 5000–1000 cm$^{-1}$ band in order to establish the structure of the acid on the zeolite;

optical microscopic examination and electronic scanning microscopy (ESM) in order to verify the form and distribution of the particles before and after the process of superficial modification of the zeolite with the acid;

thermal differential analysis between 100° C. and temperatures definitely exceeding the melt point or the decomposition temperature of the acid, in order to establish the behaviour of the nucleating system during the covnersion processes.

The capabilities of the zeolites herein above described to chemically adsorb the carboxylic acid, may be better established by the adsorption isothermal line in aqueous or organic systems obtained by measuring the concentrations at the equilibrium point in the two phases, the solid one and the one in solution, according to a well known technique, described in detail in the work of A. Savitsky & B. Wiers ("Adsorption of Organic Compounds on Zeolite Surface" in *Env. Sc. Tech.* 15 pag. 1191 (1981)).

The nucleating system object of the present invention is incorporated into the polymer by means of the usual mixing techniques which ensure an intimate and homogeneous distribution of the agents modifying the crystallization of the matrix. The processes most usually used consist in principle of a first mixing together of the powdery components, using conventional mixers for powders of the type of Henschel mills, V-mixers or ribbon mixers as well as simple tumbler mills.

The operation is carried out at either room temperature or at any rate at such a temperature that will not prejudice the nucleating capabilities of the system.

There are used polymers in the form of a dry powder in a granulometric distribution lower than or equal to 50–200 mesh, or there are also used polymers in "flakes", possibly in the presence of stabilizers or additives, according to what is well known to the skilled in the Art.

There may be prepared either total mixtures or concentrated masterbatches if one intends to intervene furthere in the formulation.

The mixture is then transformed as such, or suitably additioned with a further admixture of polymer and/or additives, in granules or extruded strings, molded plate, callendered sheets, according to Prior Art techniques.

It is essential to achieve and maintain a homogeneous distribution of the nucleating system in the molten and crystallized polymeric matrix; this may be realized, for instance, by means of an intimate mixing together of the nucleating composition with the polymeric material, at temperatures greater than the melt temperature of the polymer (see U.S. Pat. No. 4,184,026).

The equipment on which these mixings are carried out are quite known and are:
Brabender type mixer with a chamber for plastics or rubbers;
Banbury type mixer with rotor, suited for plastics at temperatures up to 250° C.;
Farrel type continuous mixer, with a plurality of heating zones;
Single or double-screw extruders for plastic materials, to be chosen with regard to the polymeric matrix and provided with a ventilation zone;
Werner type mixer with co-rotating sectional screws composable according to the material and fillers to be used.

In the case of thermoplastic matrixes, such as polyolefins, thermoplastic polyesters, etc., the suitable mixing temperature varies with the melt index of the plastic material and with its degree of thermomechanical stability, but is at anyrate greater by at leAST 20°–50° C. than the melt temperature of the polymer. Prerogative of the present invention is the protective action that the zeolite exerts on the carboxylic acid and that renders the processing temperature for the acid itself less critical (for the lower tendency to sublimation and to the decomposition by decarboxylation).

In general there is chosen an acid with a melt point lower than the processing temperature of the polymeric matrix. For instance, in the case of a nucleating system wherein the organic compound belongs to the class of the arylcarboxylic acids, there may be used products comprised, as far as melt temperatures are concerned, in the range of between 130° and 300° C.: e.g. p.ter-butylbenzoic acid (168° C.), p.toluic acid (181° C.), alpha-naphthoic acid (161° C.), and beta-naphthoic acid (184° C.), phthalic acids (200°–300° C.).

The nucleating system according to the present invention is used in such a quantity that the total aryl-carboxylic or sulphonic acid present be equal to at least 0.01 parts by weight per 100 parts of polymer.

The quantity most suitable, in general is comprised between 0.02 and 0.1 parts by weight.

The surprising effect achieved with the nucleating system according to this invention is evidenced by the fact that by incorporating by simple mechanical mixing in the polymeric material the arylcarboxylic acid and the zeolite, under such conditions whereby no adduct is formed, the nucleating effect attained is negligible when the quantities of acid fall within the above indicated range. In this connection please note the test reported in example 7, Table 6.

The ponderal (by weight) ratio between chemically adsorbed organic acid and the zeolite is preferably comprised between 2 and 10 parts by weight for 100 parts of zeolite.

The effectiveness of the nucleating system on the type and crystallization rate may be evaluated with different techniques. Amongst these the most significant are based on the following physical methods:
differential thermal analysis of the melt and crystallization process;
physical properties (melt temperature, crystallinity, Vical viscosity degree) of test pieces molded under ASTM conditions);
optical or mechanical properties of a manufactured article, obtained by molding of the nucleated polymer in comparison with the polymer as such (e.g.: film, plate), amongst which may be considered the transparency, haze, elastical modulus or the yield point.

In most of the examined cases, that is on test-pieces obtained according to the techniques described in example from 1 to 7, there has been used the differential thermal analysis (DTA) or the differential colorimetry (DSC) whose principles have been widely described in the following specific texts to which we refer also for the experimental part:

E. Bacon Ke—Newer Method of Polymer Characterization—*Interscience* 1969 (cited: H. N. Beck et al., J. Appl. polymer Science 9, 2131, 1965), C. Duval—Thermal Methods in Analytical Chemistry in: "Wilson—Comprehensive Analytical Chemistry VII"—*Elsevier* 1976; M. Richardson—Quantitative Scanning Calorimetry—in *Applicational Science Pr.* 1978.

A typical procedure uses micro-specimen (2–20 mg) obtained from injection molded plates that have been quenched or annealed.

After premelting in the calorimetric cell or DTA, at a temperature at least 20° C. above the melt point of the polymer, the specimen is subjected to a gradual cooling down according to gradient $\Delta T/t$ ranging from 8° C. to 32° C./minute. During this cooling cycle there takes place the crystallization process that reveals itself on the DTA or DSC diagram as an exothermic peak with respect to the baseline (due $\Delta C_p/T$).

The nucleating effect influences the initial or start temperature and the maximum crystallization rate and, even if in a lesser degree, the variation of the conversion heat expressed by the peak area (various authors in M. Mucha in "Melt isotacticity Polypropylene"—*Polymer Symp.* 69, page 79 (1980)).

The extent of the nucleating effect is obtained from the different ($\Delta T$) between the crystallization temperature of the specimen of the polymer as such and the crystallization temperature of the specimen of the polymer that had been additioned with the nucleating system.

The polymeric compositions which show a greater facility to crystallize display a higher initial crystallization temperature or a temperature higher than the maximum of the exothermic peak and thus a greater $\Delta T$.

Since this increase of temperature may attain 20° C. and more, it becomes evident what an advantage there is, obtained in injection molding, in terms of a reduction in molding time.

The nucleating system according to this invention may be conveniently used in polypropylene which is subjected to a treatment with organic peroxides, under heat, in order to obtain an improvement in some the physical-mechanical properties, in particular of the mechanical resistance at high temperatures.

In the following there will now be given a set of illustrative, but not limiting, examples of the present invention.

EXAMPLE 1

A. Preparation of the nucleating system

A sample of zeolite 4A (Na)—Baylith T powdery type by BAYER—of 50 grams were pre-dried in an oven at 160° C. for a period of 12-16 hours, until reaching a constant weight. On this sample, maintained on $P_2O_5$, the content in water, determined by calcining at 800° C., amounted to 8-9% b.w. The zeolitic powder was additioned to a methanolic solution of p.terbutylbenzoic acid (TBBA) in a 20% by weight concentration, in a weight ratio of 1:2. The solution of acid must have a concentration inferior to the saturation at room temperature and was obtained by the digestion of 100 g of ground TBBA with 500 ml of anhydrous methanol. The mixing must be carried out under gentle stirring because of the exothermicity of the reaction.

The suspension, after having been rebrought to room temperature, was centrifuged at a low number of revolutions in order to remove the liquid in excess; the solid cake—washed rapidly with anhydrous methanol—was dried at 110° C. until reaching a constant weight.

The nucleating composition thus obtained was characterized as follows.

On the sample—maintained on $P_2O_5$—there was carried out an analysis of C and H, by semi-micro method, in order to find the content in TBBA. The adduct thus obtained showed a content in TBBA of 14% by weight.

Figure 1B:
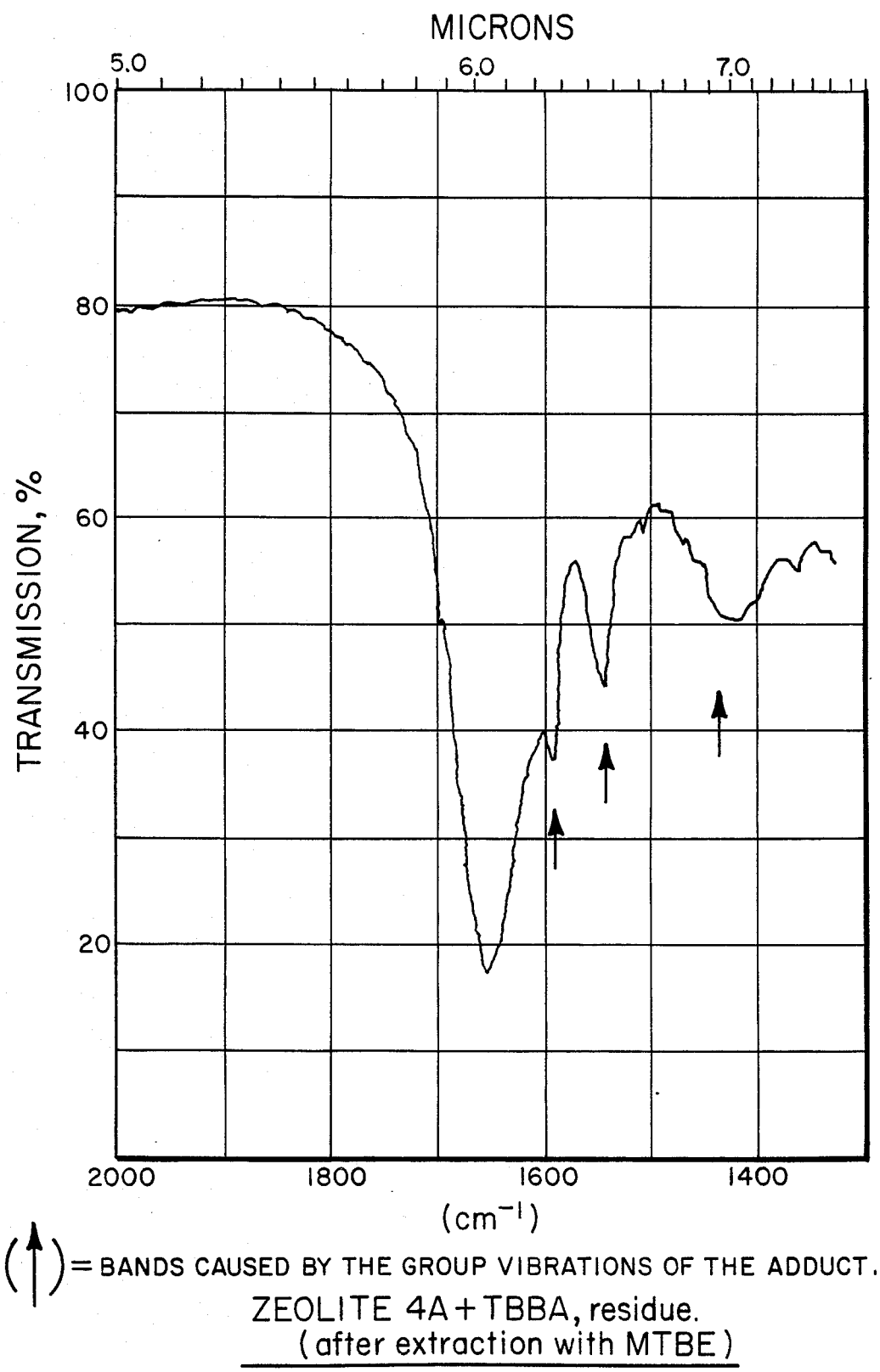

On a limited fraction of the sample there was carried out a prolonged digestion (4 hours) in methyl-ter.butyl-ether (a solvent of TBBA) in order to remove the acid present in a form not combined with the zeolitic carrier, and the residual powder at the extraction was then examined by IR-spectroscopy in order to single out the presence and determine the condition of the organic compound in the "adduct". For comparison purposes, in FIG. 1a there is reproduced the diagram (graph) obtained from the sample of the adduct as such while in FIG. 1b is reproduced the graph obtained with the residual product after extraction. In said graphs, on the ordinate there has been recorded the % transmission, on the abscissa was indicated the wave length, while the bands due to the group vibrations in the acid form were indicated with (.), while with (↑) there are indicated the bands due to the group vibrations of the adduct.

It will be noted that in FIG. 1b substantially there are present only the bands due to the group vibrations of the adduct (indicated by the arrows). In FIG. 1a there are present also the bands due to the group vibrations of the acid form (indicated by a point).

Similarly, the sample of adduct powder was examined by electronic scanning microscopy (SEM-Mark 2 produced by the Cambridge Co.) in order to verify the state of aggregation of the zeolite particles and the possible presence of heterogeneous particles, such as TBBA crystals.

B. Mixing with the polymer and molding 500 grams of isotactic polypropylene (PPI) in flakes of the MOPLEN F20 type prod. by Montedison, with a granulometry equal to 100 mesh—having a flowability index at 230° C. and 2.13 Kg of 12 g/10 minutes—were admixed in the dry state to the nucleating composition indicated at the preceding point A to the extent of 0.33 Parts per 100 parts of polypropylene and to a phenolic antioxidizer (Irganox 1010 by Ciba-Geigy) to the extent of 0.05 parts. This operation was conducted in a powder mixer of the Battagion sigma-shaped blade mill type. A part share of the mixture of powders—about 50 g—was loaded into a laboratory mixer (having a holding capacity of 60 ml) of the Brabender type with a plasticizing chamber working at 200° C.±10° C. measured at the walls.

After a few minutes the mass had become molten completely and was thereupon very rapidly transferred in a suitable portion to an electrically heated 10 ton flat press of the Moore type—with the molding plate temperature equal to 200° C., the molten material being fed into a 10×10 template. The press was thereupon rapidly closed, with a gradual increase of the pressure until achieving the complete flowing of the polymeric matrix which was then rapidly cooled down to room temperature. In this way there were obtained thin plates 1 to 2 mm thick, which serve for the physical and thermal tests (specimen 1 of Table 1).

The PPI sample obtained contained a quantity of TBBA of from 450 to 500 ppm (mg/Kg).

In a similar way there were prepared specimen from:
a mixture of PPI with the zeolite only, in a concentration of 1.25 p/100 p (phr) (specimen 2 of the table);
a mixture of PPI with 0.05 phr of pure TBBA (specimen 3 in the table);
using in both cases the mixing and forming (molding) procedures described herein above.

C. Behaviour under crystallization

Samples of polymeric thin plates, prepared as indicated above, were examined for their behavior in the crystallization and melting stages. The test was conducted on micro-specimen obtained from molded thin plates, in the cell of a Perkin-Elmer DSC 1B differential calorimeter, in a $N_2$ current, with a cooling gradient of 16° C./minute, starting from the temperature of the molten material comprised between 190° and 230° C. From the calorimetric diagram were obtained (drawn) the starting crystallization temperatures and the temperatures of the maximum exothermic peak, according to the well known methods of the analytical calorimetry.

On the attached table there have been recorded the temperatures corresponding to the maximum of the exothermic peak for micro-specimen introduced into the cell at a temperature of 190° and 230° C. with a gradient of 32° C./minute.

The table shows in a comparative way the substantial differences in the temperatures induced by the presence of even very small quantities of the nucleating system according to the present invention.

TABLE 1

| TEST PIECE n. | NUCLEATING SYSTEM | | FORMULATION in p.b.w. | | | | (×X) Crystalliz. (T max.) from melt temper.: | |
|---|---|---|---|---|---|---|---|---|
| | zeolite | TBBA % (+) | PPI | zeolite | TBBA | AO (x) | 190° | 230° |
| 1 | 4A (Baylite) | 14 | 100 | 0.33 | 0.045 | 0.05 | 124° | 121° |

TABLE 1-continued

| TEST PIECE n. | NUCLEATING SYSTEM | | FORMULATION in p.b.w. | | | | (××) Crystalliz. (T max.) from melt temper.: | |
|---|---|---|---|---|---|---|---|---|
| | zeolite | TBBA % (+) | PPI-zeolite | TBBA | AO (×) | | 190° | 230° |
| 2 | 4A (Baylite) | — | 100 | 1.25 | — | 0.05 | 118° | 111° |
| 3 | — | — | 100 | — | 0.05 | 0.05 | 119° | — |
| 4 | — | — | 100 | — | — | 0.05 | 117° | 110° |

(×) Irganox 1010 added during the mixing of the powders as an anti-oxidizer.
(+) % by weight (b.w.) on the zeolite.
(××) Measured at DSC 1 with ΔT/t = 16°/min.

EXAMPLE 2

A. Preparation of the nucleating system 20 grams of zeolite 4A (Na) prod. by Ausimont, with a content in water of 21±1% by weight, were admixed to an acetonic solution of p.terbutylbenzoic acid at a 20% concentration b.w., in the proportion of 1 part of zeolite per 3-4 parts of solution in order to obtain a sufficiently fluid suspension. This latter, after a mild stirring for 2 hours, was filtered and the solid that separated was then dried until attaining a constant weight. The powder thus obtained was analyzed for its content in C and H and was then extracted with ether in order to assess the TBBA fraction that had not been adsorbed.

The content of TBBA turned out to amount to 3.9% b.w., of which about 30% were not extractable with a solvent.

B. Mixing with the polymer and molding 50 grams of isotactic polypropylene of the type indicated in example 1, were mixed in the dry with 1.25 phr of the nucleating system of point A. and with 0.1 phr of Irganox 1010, following the methodologies described in example 1. The mixture thus obtained was melted and homogenized in internal Brabender-type mixer following the procedure already herein above indicated and by maintaining the processing times somewhat lower in order to avoid any degradation of the polymer.

Small portions of the material processed in this way were molded into laminae (thin plates) 1.5 mm thick in a flat press at 190°-200° C.

An analogous operation was carried out on powders obtained by impregnation of the same 4A zeolite with acetonic solutions of benzoic acid, and the results are recorded on Table 2. On that same table there are also reported for comparative purposes the results obtained with a zeolite/adipic acid adduct.

C. Behaviour during crystallization

On samples of molded laminae there was tested the behavior during crystallization of the PPI, nucleated with the adducts obtained from the three carboxylic acids, as well as the behavior of the PPI as such or additioned with 1.25 phr of 4A zeolite and prepared in an analogous way.

The results have been recorded on Table 2.

TABLE 2

(Nucleation of POLYPROPYLENE with ZEOLITE 4A adducted with ARC)

| ZEOLITE | nucleating COAGENT | ZEOLITIC ADDUCT | | | FORMULATION parts by weight | | | CRYSTALLIZATION Temp. at exothermic peak | |
|---|---|---|---|---|---|---|---|---|---|
| | | % H₂O | % ARC total | extractable | PPI | Zeolite | ARC | 190° | 230° |
| Z.4A(Na) Ausimont | — | 21 | — | — | 100 | 1.20 | — | 118° | 111° |
| Z.4A(Na) Ausimont | benzoic acid | 18 | 4.8 | neglig. | 100 | 1.25 | 0.05 | 121 | — |
| Z.4A(Na) Ausimont | adipic acid | 18 | 6.5 | 3.5 | 100 | 1.25 | 0.08 | 118 | 112 |
| Z.4A(Na) Ausimont | p.ter-butyl benzoic acid | 20 | 3.9 | 3.0 | 100 | 1.25 | 0.05 | 124 | 121 |
| Comparison | Sandostab (1) | — | — | — | 100 | — | 0.15 | — | 127(*) |
| " | — | — | — | — | 100 | — | — | 117 | 110 |
| " | p.ter-butylic benzoic acid | — | — | — | 100 | — | 0.05 | 119 | — |

ARC = carboxylic acid
(1) nucleating agent of the Prior Art, consisting of Al—hydroxy-p.ter.butylbenzoate
(*)On the commercial polypropylene Profax 4030 nucleated with (1), the value is 124° C.

EXAMPLE 3

A. Preparation of the nucleating system

A sample of 20 g of zeolite 4A (Na)—Type Ausimont and type Linde, produced by U.C.C., in a powdery form, was dried in an oven for 16 hours at 160° C. It was then mixed together with a concentrated solution in methyl-ter.butyl-ether (MTBE), of p.ter-butylbenzoic acid in excess of the quantity necessary for the foreseen impregnation by the superficial area of the zeolite and by the volume of the pores. The solution in excess was then separated from the solid by centrifuging and the solid was then dried at 110° C. until attaining a constant weight.

The powder thus obtained was subjected to a heat treatment in a vial, sealed after having produced a vacuum in it and brought to a temperature of 165° C., for 2 hrs.

After the cooling down in the vial of the compact powder, this latter was separated, avoiding its mixing with the sublimated TBBA, and then ground, washed with pure anhydrous MTBE and dried again at 110° C.

Thereupon there were carried out the analytical tests already indicated in the previous cases (C, H—H₂O—IR examination—electronic scanning microscopy examination [ESM]) from which it turns out that the adduct shows a content of 5.2% by weight of TBBA of which a substantial part is insoluble in the organic solvent.

By means of an analogous procedure there was prepared an adduct of TBBA on zeolite 4A (Na) of Ausimont, an adduct which turned out to contain 4% by weight of TBBA.

B. Mixing with polypropylene and molding

According to the methodologies described in the preceding cases, the adduct was mixed with PPI in flakes at 1.0 phr together with 0.1 phr of an antioxidizer and lubricant (glycerylmonostearate).

This mix was directly molded in a flat press to the shape of a 1-2 mm thick lamina. In order to avoid degrading of the PPI, the powder was preliminarily transformed into tablets whereafter the mold, in the shape of a template, was filled with a weight of tablets 10-20% greater than the volume corresponding to the volume of the mold; at a temperature of about 150° C. The plates of the press and the mold were rapidly brought up to 200° C. and after a few minutes the press was then pneumatically closed until reaching a constant pressure.

The polymer was allowed to dwell in the press for a few minutes whereafter the diecasted lamina with the mold were cooled down between two metal plates to room temperature. The resulting laminae were examined as they were and then annealed at 120° C. On the cooled down and annealed lamina was then evaluated its behavior during crystallization, following the procedure indicated in the preceding examples, that is, measuring the temperature of the maximum crystallization in tests on the Perkin+Elmer DSC 1B with $\Delta T/t = 16°$ C./min.

The results of the thermal analysis examination have been recorded on Table 3 together with the comparative data when using the nucleating agent of the Prior Art and with the zeolite alone.

order to verify the possible presence of TBBA in the form of free acid.

B. Mixing and molding with polypropylene

According to the methodologies described in the preceding example, the powder thus obtained was admixed to PPI in flakes in a quantity of 4 parts per 100 parts of polymer together with 0.1 phr of Irganox 1010 antioxidizer and 0.05 phr of glycerin monostearate as a lubricant.

The product resulting from this mixture was directly molded on a flat plate press in the form of a lamina of 1.0-1.5 mm thickness, according to the procedures given in example 3. The laminae were subjected to thermal conditioning at 80°-100° C. before the examination by thermal analysis.

C. The behavior of the nucleated PPI during crystallization was followed by means of measurements on DSC calorimeter, on test-pieces obtained from laminae molded under the conditions indicated in the preceding examples. The composition of the nucleating system and the results of the tests on the DSC have been recorded on Table 4.

TABLE No 4

| ZEOLITE-based NUCLEATING SYSTEM FROM A SOLUTION | | POLYMER FORMULATION | | | | Max. T of crystallization of molten mass (initial $T_{max}$.) |
|---|---|---|---|---|---|---|
| Imbibition solvent | TBBA % in adduct | PPI | Z.4A | TBBA | Additives | |
| — | — | 96 | 4 | — | 0.15 | 112° |
| acetonitr./H₂O | 0.85 | 96 | 4 | 0.03 | 0.15 | 118° |
| t.butyl.ether | 0.7 | 96 | 4 | 0.03 | 0.15 | 117° |

EXAMPLE 5

TABLE 3

| Example no | Zeolite type | TBBA % by weight on the zeolite | Formulate, parts by weight | | | Crystallization: °t at max. peak after melting | |
|---|---|---|---|---|---|---|---|
| | | | PPI | Zeolite | TBBA | 190° C. | 230° C. |
| 3 | 4A (Na) Union Carbide | 5.2 | 100 | 1 | 0.05 | — | 124° |
| 3a | 4A (Na) Ausimont | 4 | 100 | 1 | 0.04 | — | 124.5° |
| Comparison | 4A (Na) Union Carbide | — | 100 | 1 | — | — | 100° |
| Comparison | — | nucleant EC.1 (*) | 100 | EC1 = | 0.2 pp | — | 120° |

(*) Man. red by E.C. Chem. Ind. Japan (dibenzylidene-sorbitol).

EXAMPLE 4

A. Preparation of the nucleating system

A sample of zeolite 4A—of the Linde type in U.C.C. powder—in a quantity of 20 grams, was admixed to 100 ml of a diluted solution of TBBA in:
acetonitrile/water 84:16 (azeotropic mixture at 760 mm),
methylterbutylether saturated with water at 40° C. (abt. 1.5%). The concentration of this solution must be such as to make disposable at least one TBBA equivalent for one Na equivalent of the zeolite.

This solution was left in contact, under a mild stirring, until reaching a constant in the concentration of the TBBA in the solution phase (U.V. control).

Thereupon the solid phase was dried at 160° C. until attaining a constant weight.

The powders thus obtained by the two solvent systems were analyzed with regard to the content in C, H and in H₂O and then examined by IR-spectrography in A. Preparation of the zeolite adduct-TBBA Samples of amorphous and crystalline alumino-silicates, to be found on the market, were treated with a concentrated solution of p-terbutylbenzoic acid in methanol in order to be impregnated with significant quantities of TBBA, according to processes like those described in example 1.

The examined silicate samples were characterized by the following parameters:

| | Source | SiO₂/Al₂O₃ | Cation |
|---|---|---|---|
| amorphous silicon aluminate | Ausidet | 2.5 | Na |
| zeolite 13X (Na) powder | Linde U.C. | 2.4 | Na |
| zeolite Y (Na) powder | LZY57 Bayer | 4.8 | Na |
| zeolite 5A | 520 | 2.4 | Ca |

-continued

|  | Source (powder) | SiO$_2$/Al$_2$O$_3$ | Cation |
|---|---|---|---|
|  | Grace |  |  |

Data on granulometric distribution:
amorphous Na silicon aluminate (Ausidet)=primary particles of abt. 1 micron in the form of agglomerates;
zeolite 13X—Linde (Union Carbide)=mean size between 0.5 and 2 micron;
zeolite Y-LZY57 (Bayer)=mean size between 0.25 and 2.5 micron;
zeolite 5A 520 (Grace)=mean size between 1 and 4 micron.

The amorphous Ausidet silicon aluminate has a composition about equal to zeolite 4A.

The samples were pre-dried for 16 hours in an oven at 160° C. For a control, the contents in water were measured by calcining at 800° C. The dried products were then admixed to a 20% by weight. TBBA solution in methanol in a by weight ratio of 1:1.

The mixing is carried out under a mild stirring, at room temperature.

Thereupon the solid phase was separated by centrifuging and then dried at 110° C. until reaching a constant weight. The product thus obtained, after grinding, was subjected to C-, H-analysis in order to determine the content in TBBA.

On a fraction of the product was carried out, for analytical purposes, a digestion in ether in order to evaluate the acid present in a non-combined form.

B. Mixing with polypropylene & molding 20 grams of polypropylene flakes (Moplen FL 20) were mixed together in a mill, in a dry state, with 5 grams of zeolite-TBBA adduct according to the indications of example 4, in the presence of 0.1 g of antioxidizer. The master-batch samples thus obtained were preserved in a dry environment before being diluted with PPI flakes in the established ratios based on the content in nucleating TBBA agent in the adduct.

Said ratios were chosen in such a way that in the molded polymer were present concentrations of the adduct comprised between 0.5 and 1.0 phr, corresponding to a concentration in TBBA comprised about 200 and about 500 ppm (see Table 5).

The various mixes obtained from the single silicon aluminates were homogenized and melted together in a Brabender-type mixer (see example 2); the polymeric mass drawn from the mixer or mill was molded in limited portions in a flat press, according to the data given in the preceding examples, so as to yield laminae of a constant thickness of about 1.5 mm and showing a good surface.

An analogous operation was carried out with mixes of PPI, silicatic powder free of organic co-nucleant, stabilizing additives in ratios similar to those of the nucleated samples (see Table 5).

C. Behavior during crystallization

The behavior during crystallization is evaluated according to the already previously indicated criteria, based on measures made by differential calorimetry.

TABLE 5

Nucleation of isotactic polypropylene (PPI) with silicon aluminates/TBBA

| Silicon aluminates | TBBA % on the silicate total | TBBA % on the silicate extractable | Formulation in parts by weight PPI | Formulation in parts by weight Silico-aluminate | Formulation in parts by weight TBBA | Crystallization: T$_{max}$ OF premelt peak at 230° C. |
|---|---|---|---|---|---|---|
| Amorphous silicon-aluminate (AUSIDET) | — | — | 100 | 1 | — | 112° C. |
| Amorphous silicon-aluminate (AUSIDET) | 21 | 21 | 100 | 0.45 | ca. 0.1 | 116° C.. |
| Zeolite 5A (Ca) (Grace) | — | — | 100 | 1 | — | 110° C. |
| Zeolite 5A (Ca) (Grace) | 17 | 11 | 100 | 0.25 | ca. 0.045 | 116° C. |
| Zeolite 5A (Ca) (Grace) | 17 | 11 | 100 | 0.45 | ca. 0.085 | 118° C. |
| Zeolite 13X (Linde) | — | — | 100 | 1.2 | — | 110° C. |
| Zeolite 13X (Linde) | — | — | 100 | 0.5 | — | 110° C. |
| Zeolite 13X (Linde) | 8 | 6.2 | 100 | 0.5 | 0.04 | 117° C. |

EXAMPLE 6

A. Preparation of nucleating system

The nucleating system was prepared by impregnation of: ZEOLITE 4A (Na)—Baylith T Bayer powder—predried at 160° C., with a methanolic solution of p.ter.-butylbenzoic acid according to that described in part "A" of example 1.

The sample showed a content TBBA adduct on the zeolite of 4% by weight.

B. Mixing with the polymer and molding 100 g of block copolymers of the propylene—MOPLEN EP C 30 by Montedison having a content in propylene mols of 90% and with a fluidity index (ASTM method) at 230° C. and 2.1 Kg, of 6 g/10 min., were mixed together with 1 phr of a nucleating system in the dry state. This operation was conducted in a Battagion-type powder mixer.

This mixture was then homogenized and molten following the process described in part B of example 1.

100×100×1.5 sized laminae, not suited for physical-mechanical tests, were obtained by pressure molding at press temperatures of 190°±10° C. according to what is described in example no. 1. These laminae were then annealed at a temperature of 140° C. for 2 hours between glass plates.

C. Measurement of mechanical properties

From the molded and annealed laminae there were obtained by punching (die-cutting) ASTM-micro test-pieces used for the measurement of the following properties:

| MECHANICAL PROPERTIES OF ASTM-micro test pieces of MOPLEN EPC 30: | | | | |
|---|---|---|---|---|
|  | Unit | as such | nucleate | ASTM stand. |
| linear shrinkage at molding | % | 2.2 | 1.5 | MA 17086 |
| elasticity modulus under bending | Kg/cm$^2$ | 14,000 | 15,000 | D 790 |

-continued

| MECHANICAL PROPERTIES OF ASTM-micro test pieces of MOPLEN EPC 30: | | | | |
|---|---|---|---|---|
| | Unit | as such | nucleate | ASTM stand. |
| tensile strength (room temperature) | Kg/cm$^2$ | 270 | 310 | D 638 |

EXAMPLE 7

A. Preparation of nucleating system

A zeolite 4A (Na) sample of the powdery type and a sample of 13X (Na), of the powdery type, both prod. by LInde-U.C.C., in the quantity of 50 grams, were pre-dried for 12–16 hours in an oven at 160° C. (until attaining a constant weight).

10 g samples of the powder thus dried, were slowly added, under mild stirring, to about 20 ml of a methanolic solution of typical arylcarboxylic acids ARC [p.toluic acid-p.hydroxybenzoic acid-2-naphthoic acid].

The ARC-solutions in methanol must have a concentration below saturation at room temperature and must be obtained by digestion of 5 grams of pure product for analysis (C. Erba or Merck) in 45 ml of methanol.

The zeolite suspension in the solution is maintained under stirring for a few hours and was then centrifuged at a medium number of revolution per minute, in order to separate the solution in excess of the impregnation solution. The solid cake, rapidly washed with anhydrous methanol, was then dried at 120° C. until attaining a constant weight.

On the samples thus obtained—preserved on $P_2O_5$—one analysis was carried out for C and H, and one analysis for $H_2O$, by means of semi-micro methods in order to establish the content in arylcarboxylic (ARC) acid, both free and combined (see Table 6). On this same powder was then carried out an IR-spectroscopic analysis in the 1300–1800 cm$^{-1}$ range in order find the presence and the combination state of the organic compound in the adduct (see example 1).

The "zeolite-ARC" adduct sample was moreover examined by optical microscopy or electronic scanning microscopy in order to evidence the state of aggregation of the zeolite particles and the possible presence of particles heterogeneous to the zeolite.

B. Mixing with the polymer and molding 50 g of isotactic polypropylene in flakes of the Moplen F20 type having a fluidity index, at 230° C. and 2.16 Kg., of 12 g/10 min.—was mixed together in the dry state with 5 grams (10 phr) of the nucleating compound (zeolite+ARC) and 0.25 phr of phenolic antioxidizer plus a lubricant.

The operation was carried out in a mixer for powders of the conventional sigma blade type, at room temperature.

A Part share of the master-batch thus obtained—5 or 10 grams—was loaded into an internal Brabender-type mixer together with 40 g or 45 g of polypropylene according to the methodology described in Part B. of example 1.

From the mass discharged by the mixer there was drawn a portion for pressure molding in a flat press of 2 mm thick laminae, according to what is indicated in example 1. The quantity of zeolite and nucleating agent present in the molded polymer is recorded on Table 6.

C. Behaviour during crystallization

Micro samples of the polymeric laminae thus molded were obtained by "die cutting" and were then examined for their behavior during melting and crystallization. This examination was conducted on a differential calorimeter, according to the procedures described in example 1, part C.

Table 6 reports on a comparative basis, with respect to the formulations used, the crystallization temperature deduced from the maximum of the exothermic peak of crystallization.

Table 6 also reports the data of a test carried out measuring 50 g of polypropylene of the type used in this example with 2.5 g of zeolite 13X, pre-dried at 160° C. to a constant weight, with 0.25 g of TBBA and 0.125 g of antioxidizer+lubricant, in a mixer for powders, at room temperature.

Thereupon, 5 grams of this mixture were mixed together in a Brabender-type mixer with 45 g of polypropylene, at the conditions indicated under the preceding point B., and with resulting mixture were prepared the test pieces.

On Table 6 have been recorded the compositions and the result of this test in which the components, acid and zeolite, were mechanically admixed to the polymer under such conditions as will avoid the formation of the adduct.

TABLE No 6

| Nucleation of ISO POLYPROPYLENE with ADDUCTS ZEOLITE-ARYLCARBOXYLIC ACID (ARC) | | | | | | | | |
|---|---|---|---|---|---|---|---|---|
| | Arylcarboxylic Acid | | | | | | | Crystallization $T_{max}$ |
| | | % content on zeolite | | Formulation, parts by weight | | | | exoth. peak (crystall. |
| ZEOLITE | Type | Total | Extractable | PPI | zeolite | ARC | Stab. | from 230° C.) |
| LINDE 4A (Union Carbide) | — | — | — | 100 | 1 | — | 0.1 | 111° ± 1° C. |
| LINDE 4A (Union Carbide) | 2.naphtoic | 1.5 | 0.8 | 100 | 2 | 0.030 | 0.1 | 116° |
| LINDE 4A (Union Carbide) | p.hydroxy benzoic | 3.5 | 2.5 | 100 | 1 | 0.035 | 0.1 | 114° |
| LINDE 13X (Union Carbide) | — | — | — | 100 | 1 | — | 0.1 | 110° |
| LINDE 13X (Union Carbide) | p.toluic | 4.5 | 2.0 | 100 | 1 | 0.045 | 0.1 | 115° |
| LINDE 13X (Union Carbide) | n.naphtoic | 4.0 | — | 100 | 1 | 0.040 | 0.1 | 116° |
| LINDE 13X (Union Carbide) | n.naphtoic | 2.6 | 1.3 | 100 | 2 | 0.050 | 0.1 | 117° |
| LINDE 13X | TBBA (**) | 10 | 10 | 100 | 0.5 | 0.05 | 0.025 | 110.5° |

TABLE No 6-continued

| | Nucleation of ISO POLYPROPYLENE with ADDUCTS ZEOLITE-ARYLCARBOXYLIC ACID (ARC) | | | | | | | |
|---|---|---|---|---|---|---|---|---|
| | Arylcarboxylic Acid | | | | | | | Crystallization $T_{max}$ |
| | | % content on zeolite | | Formulation, parts by weight | | | | exoth. peak (crystall. |
| ZEOLITE | Type | Total | Extractable | PPI | zeolite | ARC | Stab. | from 230° C.) |
| (Union Carbide) | | | | | | | | |

(*) The ZEOLITE-ARC is extracted under heat (50° C.) with methyl-t.butyl-ether in a ratio of about 1:40, for about 1 hour. On the soluble fraction and on the residue there was measured the content in ARC and a spectrophotometric IR examination was carried out.
(**) Mechanically mixed with the zeolite and the polymer in a ratio of 1:10 on the zeolite.

What is claimed is:

1. An adduct obtained by the interaction of:
   (a) an aryl-carboxylic or sulphonic acid, selected from those which, in the form of metal salts, characteristically exert a nucleating effect on crystalline polymers of the alpha-olefins, said acid having a melt point greater than the crystallization temperature of the polymer and being thermally stable at the maximum operating temperature in the processing of the polymeric material and
   (b) a crystalline aluminum silicate of an alkaline or earth-alkaline metal of zeolitic tectosilicate, having a pore diameter comprised between 3 Å and 13 Å and a molar ratio $SiO_2/Al_2O_3$ comprised between 2 and 5, in a powdery form, under such conditions that will allow to obtain a chemio adsorption of acid (a) in component (b), the adduct being characterized in that acid (a) is present in quantities comprised between 1 and 25 grams per 100 g of component (b), and that it is partly bound to component (b) by chemical bonds of a polar type, said adduct being further characterized in that it is a nucleating agent for crystalline polymers and copolymers of alpha-olefins, thermoplastic polyesters and polyamides.

2. Nucleating agent according to claim 1, characterized in that the process for obtaining the adduct between zeolitic component and the acid consists in the impregnation-mixing at the melt temperature of the acid or in the mixing-exchanging from partially aqueous solutions of the acid.

3. An adduct according to either claim 1 or 2, characterized in that component (b) is chosen from the group comprising type 3A, 4A, 5A, 10X, 13X and Y zeolites in the form salified with Na and/or K and/or with Ca.

4. An adduct according to either claim 1 or 2, characterized in that component (a) is the p.ter.butyl-benzoic acid.

5. An adduct according to one of the preceding claims, characterized in that acid (a) is present in a quantity equal to 2-10 grams/100 grams of component (b).

6. Process for producing manufactured articles of crystalline thermoplastic polymers endowed with improved physical properties suited for injection molding from a polymer modified with at least 0.5 parts/100 parts of polymer of a micronized solid nucleating system consisting of a zeolitic carried as claimed in claims 1, 2 or 3 and of an arylcarboxylic or sulphonic acid chemically adsorbed on the carrier and which is contained in the polymeric matrix in a concentration equal to or greater than 0.01 phr.

7. Compositions based on crystalline polymers and copolymers of the alpha-olefins, containing from 2 to 6 carbon atoms, and consisting of the adduct of claim 1, in such quantity as to have at least 0.01 parts by weight of acid (a)/100 parts by weight of polymer.

8. Compositions according to claim 5, characterized in that they contain the adduct in quantities equal to between 0.02 and 0.1 parts of acid (a) per 100 parts of polymer.

9. Method for producing a polypropylene at a controlled crystallization rate comprised between 1 and 10 times the crystallization rate of a non-modified polymer, said method comprising:
   a. the preparation of an adduct between a zeolite of the type A and X and the t.butyl-benzoic acid by chemio-adsorption according to claim 1;
   b. the mixing together with isotactic polypropylene powder in certain crystallization rate; and
   c. the granulation of the mixture of powders a and b, in the presence of stabilizers according to known methodologies.

* * * * *